(12) United States Patent
Michalski et al.

(10) Patent No.: US 6,390,506 B1
(45) Date of Patent: May 21, 2002

(54) FASTENING SYSTEM FOR FIXING A MOTOR VEHICLE STEERING COLUMN ASSEMBLY UNIT

(75) Inventors: Herniu Michalski, Brinkum; Fabian Metzger, Weyhe; Jens Vortmeyer, Preussisch-Oldendorf; Andreas Rumpke, Rehden, all of (DE)

(73) Assignee: NACAM Deutschland GmbH (DE)

( * ) Notice: Subject to any disclaimer, the term of this patent is extended or adjusted under 35 U.S.C. 154(b) by 0 days.

(21) Appl. No.: 09/462,736
(22) PCT Filed: May 12, 1999
(86) PCT No.: PCT/DE99/01435
   § 371 Date: May 30, 2000
   § 102(e) Date: May 30, 2000
(87) PCT Pub. No.: WO99/60280
   PCT Pub. Date: Nov. 25, 1999

(30) Foreign Application Priority Data

May 14, 1998 (DE) .......................... 198 21 646

(51) Int. Cl.$^7$ ................................. B62D 1/16
(52) U.S. Cl. .................... 280/779; 248/229.1; 403/373; 411/413
(58) Field of Search .............. 280/779; 411/412, 411/413; 403/290, 373; 248/229.1, 229.11

(56) References Cited

U.S. PATENT DOCUMENTS

| | | | |
|---|---|---|---|
| 1,539,826 A | * 6/1925 | Boutelle | 411/413 |
| 2,860,319 A | * 11/1958 | Short | 411/413 |
| 3,478,639 A | 11/1969 | Gruca | |
| 3,600,971 A | * 8/1971 | Scarvelis et al. | 74/492 |
| 4,022,536 A | * 5/1977 | Piepho et al. | 403/16 |
| 4,671,324 A | 6/1987 | Neill | |
| 4,900,178 A | * 2/1990 | Haldric et al. | 403/24 |
| 6,073,965 A | * 6/2000 | Kinoshita et al. | 280/779 |

FOREIGN PATENT DOCUMENTS

| | | |
|---|---|---|
| DE | 145 811 | 1/1981 |
| DE | 3825177 | 12/1989 |
| EP | 0 309 344 | * 3/1989 |
| EP | 0 571 834 | * 12/1993 |
| EP | 0774399 | 5/1997 |

* cited by examiner

*Primary Examiner*—Peter C. English
(74) *Attorney, Agent, or Firm*—McGlew and Tuttle, P.C

(57) ABSTRACT

A fastening system for fixing a first assembly unit to a second component for use especially in the motor vehicle industry is presented, which has at least one fastening screw, a corresponding first preassembly thread on the first assembly unit, in which the fastening screw is fixed after the preassembly, and a fastening thread on the first assembly unit or on the second component for fixing the first assembly unit to the second component by means of the fastening screw. The fastening screw has at least two threaded areas for preassembly and for fastening with different thread pitches, wherein the preassembly thread and the fastening thread as well as the threaded areas are provided with different pitches and the second threaded area, which is used for fastening and is facing away from the screw head, has a smaller diameter than the threaded area that is used for the preassembly and is adjacent to the screw head.

12 Claims, 2 Drawing Sheets

FASTENING SYSTEM FOR FIXING A MOTOR VEHICLE STEERING COLUMN ASSEMBLY UNIT

FIELD OF THE INVENTION

The present invention pertains to a fastening system for fixing a motor vehicle steering column assembly unit.

BACKGROUND OF THE INVENTION

Such fastening systems are used, e.g., to fix preassembled steering column assembly units on the body of a motor vehicle within the framework of the final assembly. At the time of the preassembly of a steering column assembly unit, one or more fastening screws are screwed into a preassembly thread each, which is preferably formed in the housing of the steering column assembly unit. This offers the advantage that no individual fastening elements have to be kept ready at the body during the final assembly of the steering column assembly unit. Once the steering column assembly unit has been brought into its final position in the course of the final assembly on the body, the fastening screws are screwed into a second fastening thread. This fastening thread may be located either directly on the body structure of a motor vehicle or also in an extension of the preassembly thread on the steering column housing. The steering column assembly unit is clamped in the second case by a body-side bracket arranged between the preassembly thread and the fastening thread. Both designs of fastening make it necessary for the fastening screw to have its thread leave the preassembly thread before the screw enters the fastening thread with its first turns or the preassembly thread will be broken, i.e., destroyed during the entry of the fastening screw into the fastening thread.

Both assembly variants described have one major drawback with respect to a possible removal of the steering column assembly unit.

In the first variant, in which the fastening screw has exited completely from the preassembly thread, the difficulty arises that loosening of the fastening screw inherently means returning of the screw into the first preassembly thread. This return is very difficult because the pressing force can usually be introduced only axially in the longitudinal direction of the screw and is ruled out nearly completely under the normal conditions of disassembly. As a result, removal of the steering column is difficult.

In the second of the above-described variants, the preassembly thread is often already destroyed completely after the first installation of the steering column. This means that this thread has to be recut after the removal of the steering column, because it can no longer be used and the ability of the steering column to be mounted is consequently limited.

German publications DE 38 25 177 A1 and DD 145 811 each describe a fastening system. Both fastening systems are for fixing a first assembly unit to a second component, which has a fastening screw. A corresponding first preassembly thread is provided on the first assembly unit, in which the fastening screw is fixed after the preassembly. A fastening thread is provided on the second component for fixing the first assembly unit to the second component by means of the fastening screw, wherein the fastening screw has two threaded areas for preassembly and for fastening. The second threaded area, which is used for fastening and is facing away from the screw head, has a smaller diameter than the first threaded area, which is used for the preassembly and is adjacent to the screw head.

Furthermore, U.S. Pat. No. 3,478,639 shows a fastening screw in which the preassembly thread and the fastening thread have different pitches.

SUMMARY AND OBJECTS OF THE INVENTION

The primary object of the present invention is therefore to eliminate the above-described drawbacks of the state of the art and to provide a fastening system that guarantees the problem-free assembly and removal of a steering column assembly unit and can be handled without problems and can be manufactured at low cost.

According to the invention, a fastening system for fixing a motor vehicle steering column assembly unit includes a fastening screw with a first threaded area and with a second threaded area. A steering column assembly unit with a steering column housing is provided, in which housing a preassembly thread corresponding to the threaded area is provided. A fastening thread is formed, which is axially aligned with the preassembly thread and is separated from same in the preassembled state by a gap. A U-shaped clamp is provided, which is fixed on the steering column housing. A bracket of the motor vehicle body is disposed at the gap, after the final assembly. This is for connecting the steering column housing with the motor vehicle body. The fastening screw passes through an opening in the bracket in the form of a slot or a hole. On the side of the bracket facing away from the preassembly thread, it engages the fastening thread with its second threaded area. With this the clamp is deformed by the movement of the screw. The clamp is then in contact with the lateral surfaces of the bracket of the motor vehicle body with its two legs and thus clamps the bracket.

According to an advantageous variant, the fastening thread may be introduced into a weld nut welded on the clamp.

According to one embodiment of the present invention, it is suggested that the fastening screw with at least two threaded areas for preassembly and for fastening be made with different thread pitches. The preassembly and fastening threads on the first assembly unit (and, depending on the design, on the second component) as well as the threaded areas of the fastening screw are provided with corresponding, different pitches. The second threaded area, which is used for fastening and is facing away from the screw head of the fastening screw, has a smaller diameter than the first threaded area of the fastening screw. The first threaded area is used for the preassembly and is adjacent to the screw head.

This special design causes the preassembly thread and the fastening thread to perform a relative movement in relation to one another in the case of the simultaneous arrangement of the screw in both threads and a corresponding screw-in movement and thus they can ultimately bring about clamping forces that permit the fixation of the steering column assembly unit on an intermediate plate fixed on the body. Both the turns of the fastening thread and of the preassembly thread remain completely intact during the fastening operation, so that a problem free removal of the assembled components is possible at any time in a simple manner and at a low cost.

Depending on the application and the space conditions of the construction to be used, the fastening system may be designed such that the thread pitch of the first threaded area is greater or smaller than the thread pitch oft second threaded area of the fastening screw. This freedom, as to modifying the design, expands the possible applications of the fastening system to other technical areas. The present invention is not limited to the above-described special field of application of a steering column fastening.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
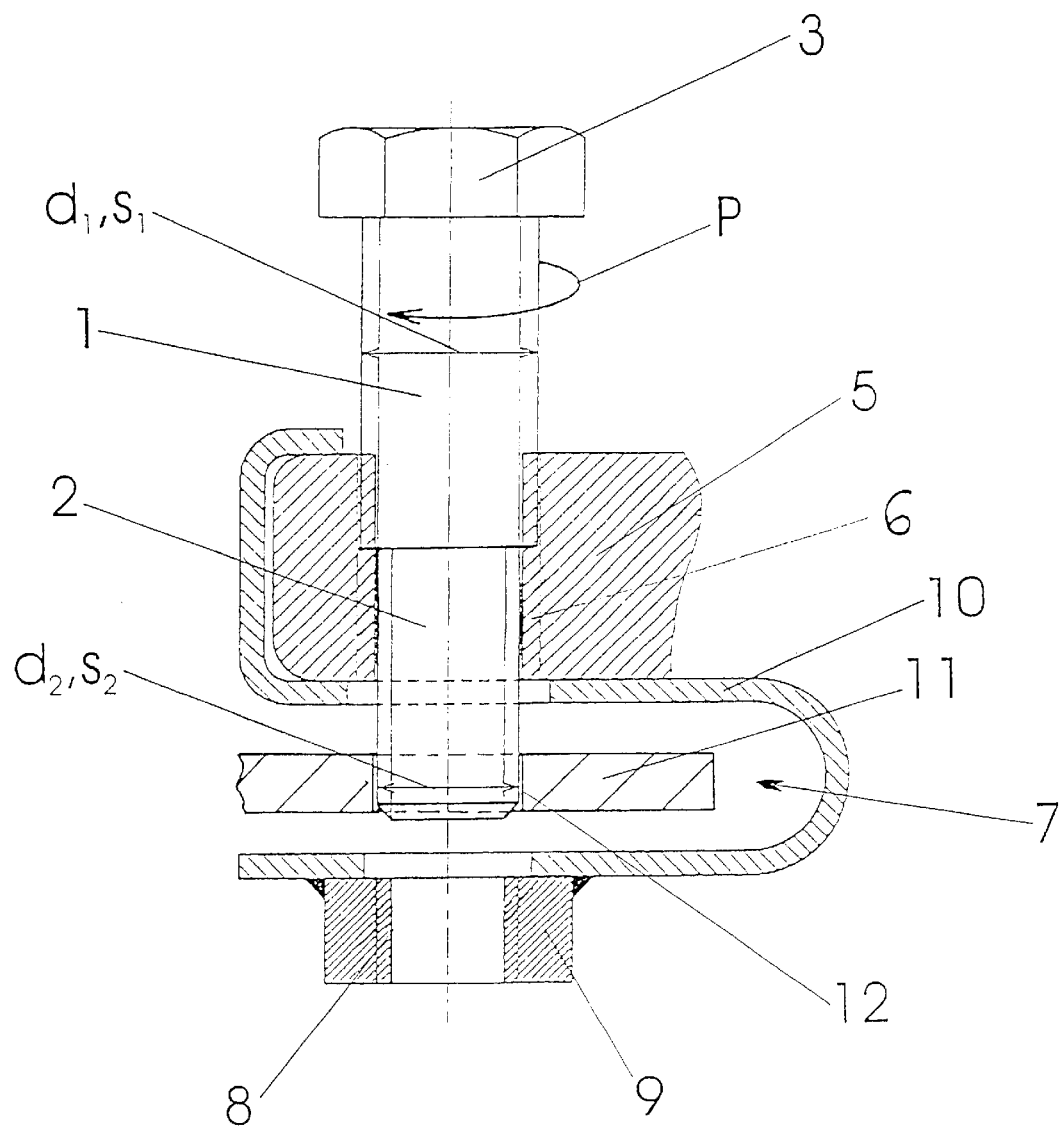
FIG. 1 is a sectional representation of an embodiment of the fastening system according to the present invention in the preassembled state and FIG. 2 is a sectional representation of the fastening system according to FIG. 1 after the final assembly in the fixed state.
Figure 2:
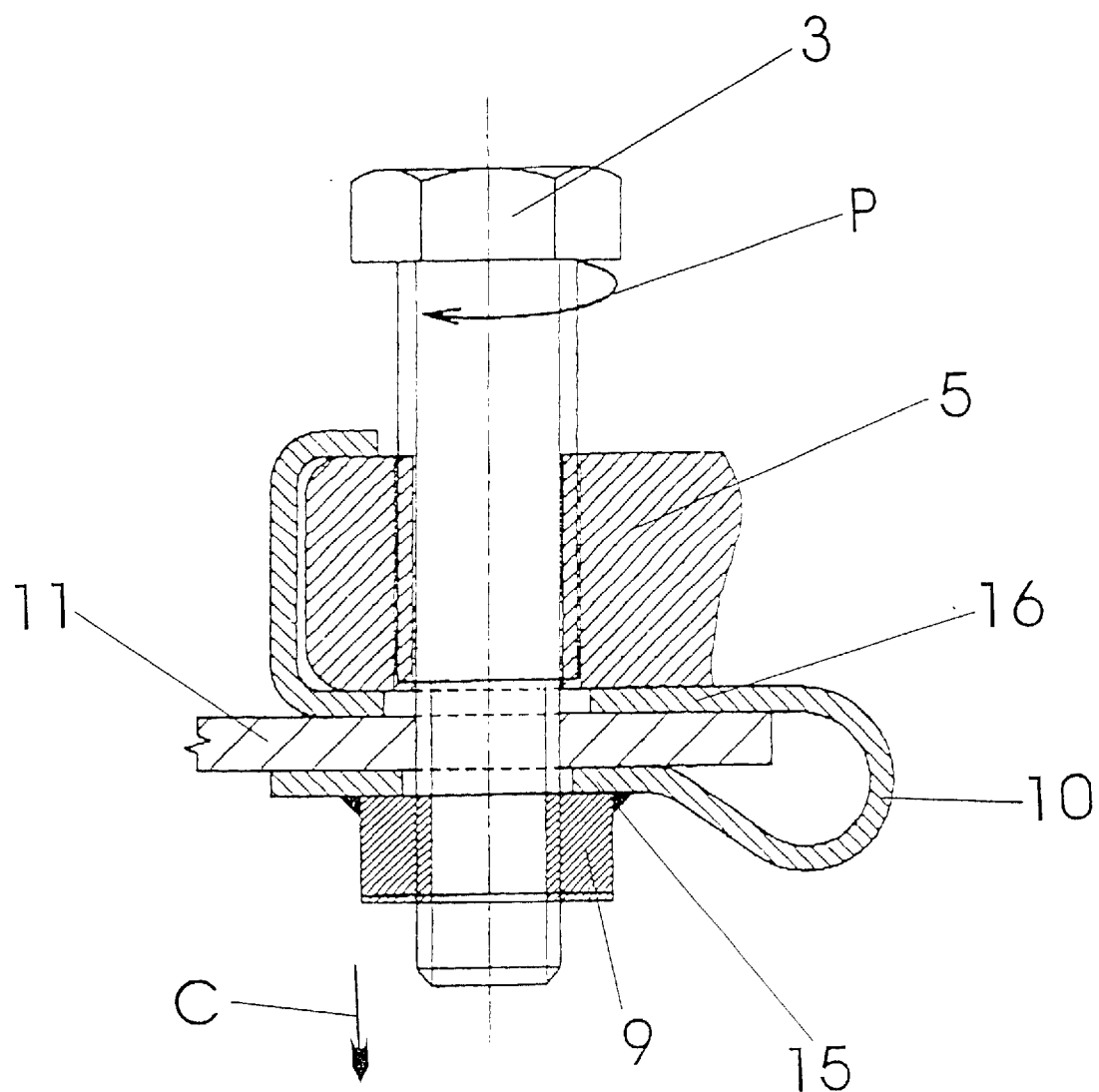

Referring to the drawings in particular, the fastening system shown in FIGS. 1 and 2 has a fastening screw 3 with a first threaded area 1 and with a second threaded area 2. The fastening system is used to fix a motor vehicle steering column assembly unit, but only details of this steering column assembly unit are shown in the representations selected here. The steering column assembly unit has a steering column housing 5, in which a preassembly thread 6 is arranged. A fastening thread 8 is arranged axially aligned with the preassembly thread 6 and separated from same by a gap 7. The fastening thread 8 is located in a weld nut 9, which is welded to a U-shaped clamp 10, which is in turn fastened to the above-mentioned steering column housing 5.

The preassembled state of the steering column assembly unit provides for the fastening screw 3 with its threaded area 1 being screwed into the preassembly thread 6 of the steering column housing 5. Within the framework of the final assembly, during which the steering column assembly unit is fixed in its final position to the motor vehicle body, a bracket 11 of the body is provided in the gap 7 of the steering column housing. The fastening screw 3 now passes through an opening 12 in the bracket 11 in the form of a slot or a hole. On the side of the bracket 11 facing away from the preassembly thread 6, the fastening screw 3 engages, with its second threaded area 2, the fastening thread 8. The threaded area 1 has a diameter $d_1$, with a pitch $s_1$. Compared with the dimensions of the threaded area 1, the diameter $d_2$ of the fastening thread area 2 is such that it can pass through the preassembly thread 6 without touching the wall surfaces. The pitch $S_2$ of the threaded area 2 is selected to be greater than the pitch $s_1$ of the threaded area 1. The effect of this arrangement is that the screwing in of the fastening screw 3 in the direction of the arrow P, with the threaded area 1 engaging the preassembly thread 6 and with the threaded area 2 engaging the fastening thread 8, causes the weld nut 9 to be displaced on the fastening screw 3 such that the width of the gap 7 will decrease.

FIG. 2 shows the sectional representation of the end position of the fastening screw 3. The clamp 10 has been deformed due to the movement of the weld nut 9 on the fastening screw 3 to the extent that the two legs 15 and 16 of the clamp 10 have come into contact with the lateral surfaces of the bracket 11 of the body and they clamp the bracket between them. The steering column housing 5 is thus rigidly connected to the body.

The loosening of the connection between the steering column housing and the body is performed analogously by turning the fastening screw 3 opposite the direction of the arrow P, while the weld nut 9 and, together with it, the leg 15 will move in the direction of the arrow C on the fastening screw 3. As a result, the clamped connection between the two legs 15 and 16 of the clamp 10 and the body bracket 11 is eliminated and the steering column housing 5 can be removed.

It is, of course, conceivable to select the pitch $s_2$ of the threaded area 2 to be smaller than the pitch $s_1$ of the threaded area 1, but the clamping between the bracket 11 and the steering column housing 5 or the clamp 10 takes place analogously to the above-described manner.

While specific embodiments of the invention have been shown and described in detail to illustrate the application of the principles of the invention, it will be understood that the invention may be embodied otherwise without departing from such principles.

What is claimed is:

1. A motor vehicle steering column assembly unit fastening system, comprising:
    a fastening screw with a first threaded area and with a second threaded area;
    a steering column assembly unit with a steering column housing, said steering column housing having a preassembly thread corresponding to said first threaded area;
    a part having a fastening thread, which is axially aligned with said preassembly thread and is separated from said preassembly thread by a gap in a preassembled state;
    a U-shaped clamp fixed on said steering column housing, said U-shaped clamp having two legs;
    a motor vehicle body bracket having lateral surfaces and having an opening, said motor vehicle body bracket being disposed in said gap after a final assembly connecting said steering column housing to the motor vehicle body, said fastening screw passing through said opening in said motor vehicle body bracket, said second threaded area engaging said fastening thread on a side of said bracket facing away from said preassembly thread such that said clamp is deformed by a screwing movement of said fastening screw and said two legs are in contact with said lateral surfaces of said bracket of said motor vehicle body and thus clamp said bracket.

2. The fastening system in accordance with claim 1, wherein said fastening thread is provided in a weld nut welded to said clamp.

3. The fastening system in accordance with claim 2, wherein a thread pitch of said first threaded area is greater than a thread pitch of said second threaded area.

4. The fastening system in accordance with claim 2, wherein the thread pitch of said first threaded area is smaller than the thread pitch of said second threaded area.

5. The fastening system in accordance with claim 1, wherein said fastening screw has a screw head, said first threaded area has a first thread pitch and said second threaded area has a second thread pitch, said first thread pitch being different from said second thread pitch, said preassembly thread having said first thread pitch and said fastening thread having said second thread pitch, said second threaded area being for fastening and spaced away from said screw head and having a smaller diameter than said first threaded area, first threaded area being used for the preassembly and being adjacent to said screw head.

6. The fastening system in accordance with claim 5, wherein a thread pitch of said first threaded area is greater than a thread pitch of said second threaded area.

7. The fastening system in accordance with claim 5, wherein the thread pitch of said first threaded area is smaller than the thread pitch of said second threaded area.

8. The fastening system in accordance with claim 1, wherein a thread pitch of said first threaded area is greater than a thread pitch of said second threaded area.

9. The fastening system in accordance with claim 1, wherein the thread pitch of said first threaded area is smaller than the thread pitch of said second threaded area.

10. A motor vehicle steering column assembly unit fastening system, comprising:

- a fastening screw with a preassembly threaded area and with a fastening threaded area;
- a steering column assembly unit with a steering column housing, said steering column housing having a preassembly thread corresponding to said preassembly threaded area;
- a structural part defining a fastening thread, which is axially aligned with said preassembly thread and is separated from said preassembly thread by a gap in a preassembled state;
- a U-shaped clamp fixed on said steering column housing, said U-shaped clamp having two legs;
- a motor vehicle body bracket having an opening, said motor vehicle body bracket being disposed in said gap after a final assembly for connecting said steering column housing to the motor vehicle body, said fastening screw passing through said opening in said motor vehicle body bracket and engaging said fastening thread, with said fastening threaded area, on a side of said bracket facing away from said preassembly thread such that said two legs of said clamp, deformed by a screwing movement, are in contact with lateral surfaces of said bracket of said motor vehicle body and thus clamp said bracket.

11. The fastening system in accordance with claim 10, wherein said structural part is a weld nut welded to said clamp.

12. The fastening system in accordance with claim in 10, wherein said fastening screw has a screw head, said preassembly threaded area has a first thread pitch and said fastening threaded area has a second thread pitch, said first thread pitch being different from said second thread pitch, said preassembly thread having said first thread pitch and said fastening thread having said second thread pitch.

* * * * *